J. F. RUTZ & J. K. LUETHE.

IGNITER TORCH FOR GAS BURNERS.

APPLICATION FILED AUG. 9, 1913.

Reissued May 19, 1914. 13,732.

Witnesses:

R. C. Brocker

Eleanor I. Fink

Julius F. Rutz
Julius K. Luethe } Inventors

By

George Wilmore Collis

Attorney

UNITED STATES PATENT OFFICE.

JULIUS F. RUTZ AND JULIUS K. LUETHE, OF MILWAUKEE, WISCONSIN, ASSIGNORS TO RULU GAS LIGHTER COMPANY, OF MILWAUKEE, WISCONSIN, A WISCONSIN CORPORATION.

IGNITER-TORCH FOR GAS-BURNERS.

13,732. Specification of Reissued Letters Patent. Reissued May 19, 1914.

Original No. 1,009,184, dated November 21, 1911, Serial No. 630,113. Application for reissue filed August 9, 1913. Serial No. 783,953.

*To all whom it may concern:*

Be it known that we, JULIUS F. RUTZ and JULIUS K. LUETHE, of Milwaukee, Wisconsin, have invented an Igniter-Torch for Gas-Burners, of which the following is a specification.

This invention relates to gas-stoves, and more particularly to means for igniting a number of burners on a gas-stove simultaneously.

Many gas-stoves have a number of burners, a common arrangement of gas stoves being that where four burners are arranged at corners of a square or rectangle. Previous to our invention the mode employed of igniting these consisted in a separate igniter or pilot-light for each burner in juxtaposition to the burners, the several igniters being controlled simultaneously or separately. Such an arrangement has the disadvantage that there are four flames constantly burning, which consume a noticeable amount of gas, require more attention and repairs and are subject to more leakage than one burner.

Our novel idea which we have carried out in the present invention, consists in disposing a single igniter centrally of the group at a distance from the burners, this igniter being itself ignited by a single pilot-flame and arranged when turned on to throw long jets of flame toward the several burners, thereby igniting them.

Our invention may be carried out in various ways, but the most improved form of the invention devised at the time of this application is shown in the accompanying drawings, and suffices to illustrate the principle thereof.

Figure 1:
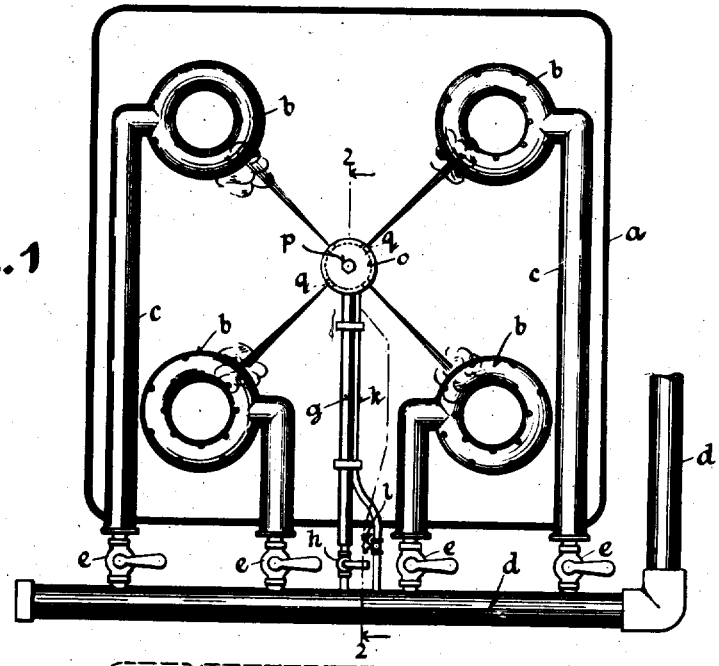
Figure 2:
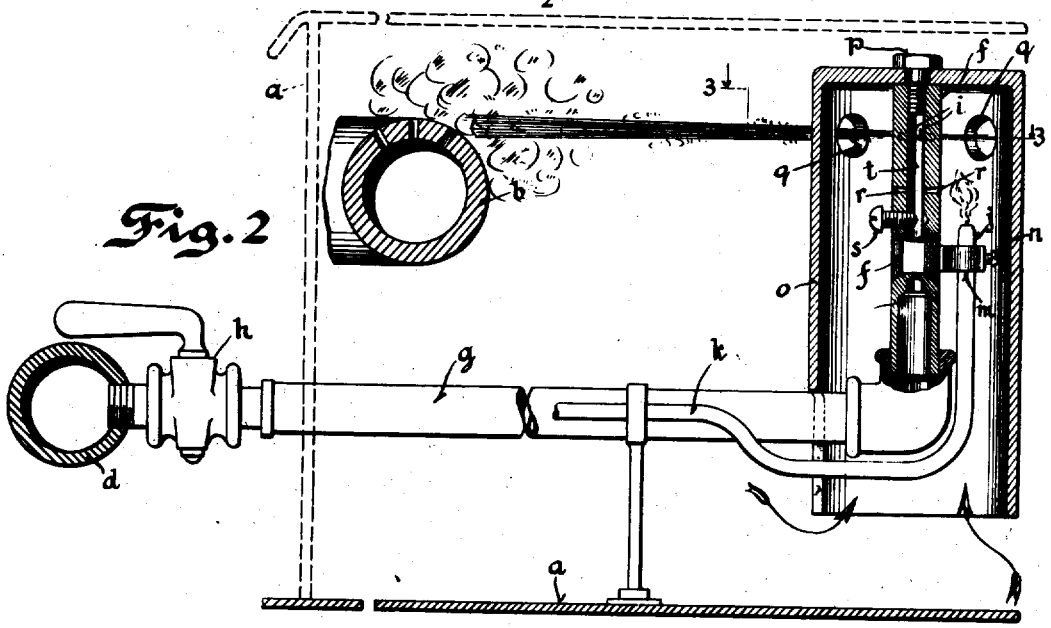
Figure 3:
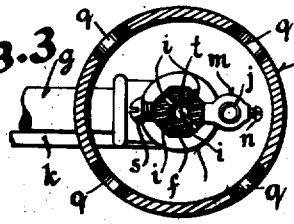

In these drawings, Figure 1 is a plan view of a gas-stove provided with an igniter according to our invention; Fig. 2 is a partially sectional elevation of the igniter separately on a larger scale, indicating also parts of a burner and the stove-frame, the section-plane of the igniter being indicated by the line 2 of Fig. 1; and Fig. 3 is a plan-section of the igniter on the plane 3 of Fig. 2.

In these drawings each reference letter or numeral refers always to the same part.

In Fig. 1 is represented a gas-stove *a* in section, the walls and top of same being shown dotted. In Fig. 2, immediately below the top thereof is located a group of four burners *b*, *b* which may be of any preferred style or pattern, this having no relevancy to our invention. Each of the burners *b* is connected by a branch-pipe *c* to a branch-supply pipe *d*, such burners having, as commonly arranged, individual regulating-valves *e*.

According to our invention, we arrange in the center of this group, and substantially on the level therewith, an igniter-head *f*, the same comprising as here shown a simple upright tube, which is connected at its lower end by a branch-pipe *g* containing a valve *h* with the supply-pipe *d*. The igniter-head *f* has bored in it, at the level of the burner-flames, four radial holes *i*, which are directed toward the respective burners so as, when the valve *h* is turned on, to direct jets of flame toward the burners of sufficient length to reach and so ignite them. For the purpose of igniting these jets we place below them a pilot-light *j*, which is simply the open end of a small tube *k* which is connected with the pipe *d* and which may, if desired, contain a regulating and cutoff valve *l*. This pilot-light may be held in place by a clip or eye *m* mounted on the side of the igniter and carrying a set-screw *n*. It will be obvious that the vertical position of the pilot-light may be readily adjusted by this arrangement.

The pilot-flame *j* is not sufficient by itself to ignite the four igniting-jets, or at least to ignite them immediately, because they do not spread and are separated from one another by too great a distance. Unless further arrangements be provided, a loss of gas with accompanying inconveniences results. To the end of producing an immediate ignition of the pilot-flame, the igniter is inclosed in a bell *o* which is closed at the top and secured to the igniter-head by cap-screw *p* screwed into its upper end. This bell has four holes *q* opposite the respective jets which are of such size as to permit the free passage of the jets but to catch sufficient of the gas on the edges of the jets to produce a gaseous mixture inside the bell, which is promptly ignited my means of the pilot-light *j*. We wish it clearly understood, however, that this feature is not an essential to the principle of our invention, as other means may be adopted of effecting the same result.

To further hasten ignition, we may form four small leak-holes *r* in the sides of the igniter-head below the jets *i* and in radial planes midway between them and in closer proximity to the pilot-flame *j*. As soon as the valve *h* is turned on, gas escapes through these holes, all of which is caught within the bell and produces a gaseous mixture sufficiently rich to be ignited immediately by the pilot-flame and thereby also ignites the igniting-jets. The length and strength of the igniting-jets may be regulated by a needle-valve consisting of a screw *s* mounted in the side of the igniter-head below the leak-holes *r*.

We have found the bell *o* is a very advantageous arrangement for several reasons. It of course screens the pilot-flame from air-currents and prevents it from being blown out. The ignition, besides being performed promptly causes all the escaped gas to be burned and thereby prevents a disagreeable smell; while the issuing of the jets through the holes *q* creates a draft which carries out all the products of combustion and thereby assures the maintenance of the flame *j*, which, unless such products were promptly removed, would go out in many cases. Moreover, a constant and adequate quantity of oxygen is at all times conveyed to the pilot-flame by its own natural draft up through the bottom of the bell as indicated by the arrows, and out through the holes *q*. In fact we have found that unless a bell, chimney or like device is used to surround the pilot-light with a supply of oxygen from a lower stratum than the burners, the pilot-light will, after the burners have been burning for a time, invariably go out, being apparently extinguished or choked by products of combustion from the burners which surround the pilot-light.

Having thus described our invention, what we claim as new and desire to secure by Letters Patent is:

1. The combination of a gas-stove having a plurality of burners, an igniter-head mounted at a distance from said burners, said igniter-head having a plurality of apertures through which jets of flame are adapted to be sent to the respective burners, means for controlling the gas-supply to said igniter-head, said head having in addition one or more supplementary apertures or leak-holes adapted to develop an inflammable gas-mixture surrounding it, and a single pilot-light adapted to ignite said gas-mixture and thereby all of said jets.

2. In combination with a gas-stove having a plurality of burners, an igniter located at a distance from said burners and having a plurality of apertures directed toward the several burners, and leak holes for the escape of the gas to surround said head, a valve controlling the flow of gas through said igniter, said apertures being adapted when said valve is turned on to project flame-jets from said igniter to the burners, a member partially inclosing a space around said igniter and inclosing all said apertures whereby an inflammable gas-mixture is developed in said space, and means for igniting said mixture.

3. The combination of a gas-stove having a plurality of burners, an igniter-head mounted at a distance from said burners, said igniter-head having a plurality of apertures through which jets of flame are adapted to be sent to the respective burners, means for controlling the gas-supply to said igniter-head, said head having in addition one or more supplementary apertures or leak-holes adapted to develop an inflammable gas-mixture surrounding it, a pilot-light adapted to ignite said gas-mixture and thereby said jets, and a bell inclosing a space about said igniter-head within which said gaseous mixture is adapted to develop and including also said pilot-light.

4. The combination of a gas-stove having a plurality of burners, an igniter-head mounted at a distance from said burners, said igniter-head having a plurality of apertures through which jets of flame are adapted to be sent to the respective burners, means for controlling the gas-supply to said igniter-head, said head having in addition one or more supplementary apertures or leak-holes adapted to develop an inflammable gas-mixture surrounding it, a pilot-light adapted to ignite said gas-mixture and thereby said jets, means for regulating the flow of gas through said leak holes and a bell closed at the top and open at the bottom surrounding said igniter-head and pilot-light and having apertures opposite the respective jets.

5. An igniter for gas-burners comprising a head having a plurality of apertures adapted to project long jets of flame radially from said head, a gas-supply for said head, a shut-off valve located in said gas-supply, a pilot-light adapted to ignite said jets, and a shield surrounding said pilot-light; said igniter-head having one or more leak-holes through which gas is adapted to escape into proximity with said flame.

6. An igniter for gas-burners comprising an upright head having a plurality of lateral holes therein adapted to deliver long jets radially from said head, a gas-supply duct for said head, a shut-off valve in said supply-duct, a bell mounted on and inclosing said head, said bell being open at the bottom and having lateral holes which register with said jets, and a constantly burning pilot-light within said bell.

7. An igniter for gas-burners comprising an upright head having a plurality of lateral holes therein adapted to deliver long jets radially from said head, a gas-supply duct in said head, a shut-off valve in said supply duct, a bell mounted on and inclosing said head, said bell being open at the bottom and having lateral holes which register with said jets, and a constantly burning pilot-light within said bell; said head having also one or more leak-holes below said apertures and out of line with the openings in said bell.

8. In combination with a gas-stove having a plurality of burners, an igniter located at a distance from said burners and having a plurality of apertures directed toward the several burners, the igniter head having a plurality of leak holes, and a valve controlling the flow of gas through said igniter, said apertures being adapted when said valve is turned on to project flame-jets from said igniter to the burners, and means being provided for insuring the maintenance of a constant small flame at or near said apertures.

9. In combination with a gas-stove having a plurality of burners, an igniter located at a distance from said burners and having a plurality of apertures directed toward the several burners, the igniter head having a plurality of leak holes, a valve controlling the flow of gas through said igniter, said apertures being adapted when said valve is turned on to project flame-jets from said igniter to the burners, a single pilot-light located near said apertures, and means for distributing the flame from the pilot-light to the several jets when said valve is turned on.

10. An igniter for gas-burners comprising a head having a plurality of apertures adapted to project long jets of flame radially from said head, said head having leak holes below said jets, a gas-supply for said head, a shut-off valve located in said gas-supply, and means for supplying a single constantly burning flame with gas, said flame being disposed so as to ignite said jets whenever said valve is turned on.

11. In combination with a plurality of separate burners, an igniter therefor comprising a head disposed at a distance therefrom with said burners situated in different radial directions from said head, said head having a plurality of apertures directed radially toward the several respective burners and adapted to project long jets of flame radially from said head to the respective burners, said head having leak holes below said jets, a gas-supply for said head, a constantly burning pilot-light at a distance from said apertures, and means for momentarily creating an inflammable gas-mixture in the space between said light and apertures whereby the flame is conveyed from said light to said apertures.

In witness whereof we have hereunto set our hands in the presence of two witnesses.

JULIUS F. RUTZ.
JULIUS K. LUETHE.

Witnesses:
R. B. Ramien,
H. M. Kellogg.